US006634132B2

(12) United States Patent
Lorenz

(10) Patent No.: US 6,634,132 B2
(45) Date of Patent: Oct. 21, 2003

(54) ANIMAL DECOY AND METHOD FOR MAKING SAME

(76) Inventor: Steven J. Lorenz, 31004 Grand Dr., Waterford, WI (US) 53185

( * ) Notice: Subject to any disclaimer, the term of this patent is extended or adjusted under 35 U.S.C. 154(b) by 0 days.

(21) Appl. No.: 10/072,026

(22) Filed: Feb. 7, 2002

(65) Prior Publication Data

US 2003/0145506 A1 Aug. 7, 2003

(51) Int. Cl.[7] .................................................. A01M 31/06
(52) U.S. Cl. ........................................................ 43/2
(58) Field of Search ..................... 43/2, 3; A01M 31/06

(56) References Cited

U.S. PATENT DOCUMENTS

| | | | | | |
|---|---|---|---|---|---|
| 2,237,897 | A | * | 4/1941 | Vos ............................. 446/388 |
| 4,251,937 | A | * | 2/1981 | Curley ............................. 43/3 |
| 4,773,178 | A | * | 9/1988 | Marek ............................. 43/2 |
| 4,821,444 | A | | 4/1989 | Remus |
| 4,852,288 | A | * | 8/1989 | Payne et al. ..................... 43/2 |
| D370,972 | S | * | 6/1996 | Dutton ....................... D22/125 |
| 5,546,692 | A | * | 8/1996 | Byers ............................. 43/2 |
| 5,572,823 | A | | 11/1996 | Savaria |
| 5,826,364 | A | * | 10/1998 | Bitting ............................. 43/2 |
| 5,943,807 | A | * | 8/1999 | McPherson ....................... 43/2 |
| 6,158,668 | A | * | 12/2000 | Burgeson ....................... 239/47 |

* cited by examiner

Primary Examiner—Charles T. Jordan
Assistant Examiner—Susan C. Alimenti
(74) Attorney, Agent, or Firm—Joseph S. Heino

(57) ABSTRACT

A decoy assembly and a method for making same includes a lightweight planar member contoured in the form of the silhouette of a large game animal. The planar member has two opposing faces. A visually and graphically accurate rendition of a large game animal is applied to each face of the planar member. The planar member is foldable so as to reduce the bulk of the decoy assembly. It also includes an aperture for suspending one or more of the assemblies from a hunter's belt. When unfolded, the decoy assembly is held open by use of a generally U-shaped clip that is attached to the planar member at the point of the fold. Toward the top of the planar member, a second aperture is provided for suspending the decoy from a tree branch or the like. Toward the rearward portion of the decoy, a pair of scent holes is provided. One scent hole is functionally adapted to receive a scent canister within it. The other scent hold is functionally adapted to receive a felt scent wick within it. A pair of support rods may be provided to make the decoy free standing.

14 Claims, 8 Drawing Sheets

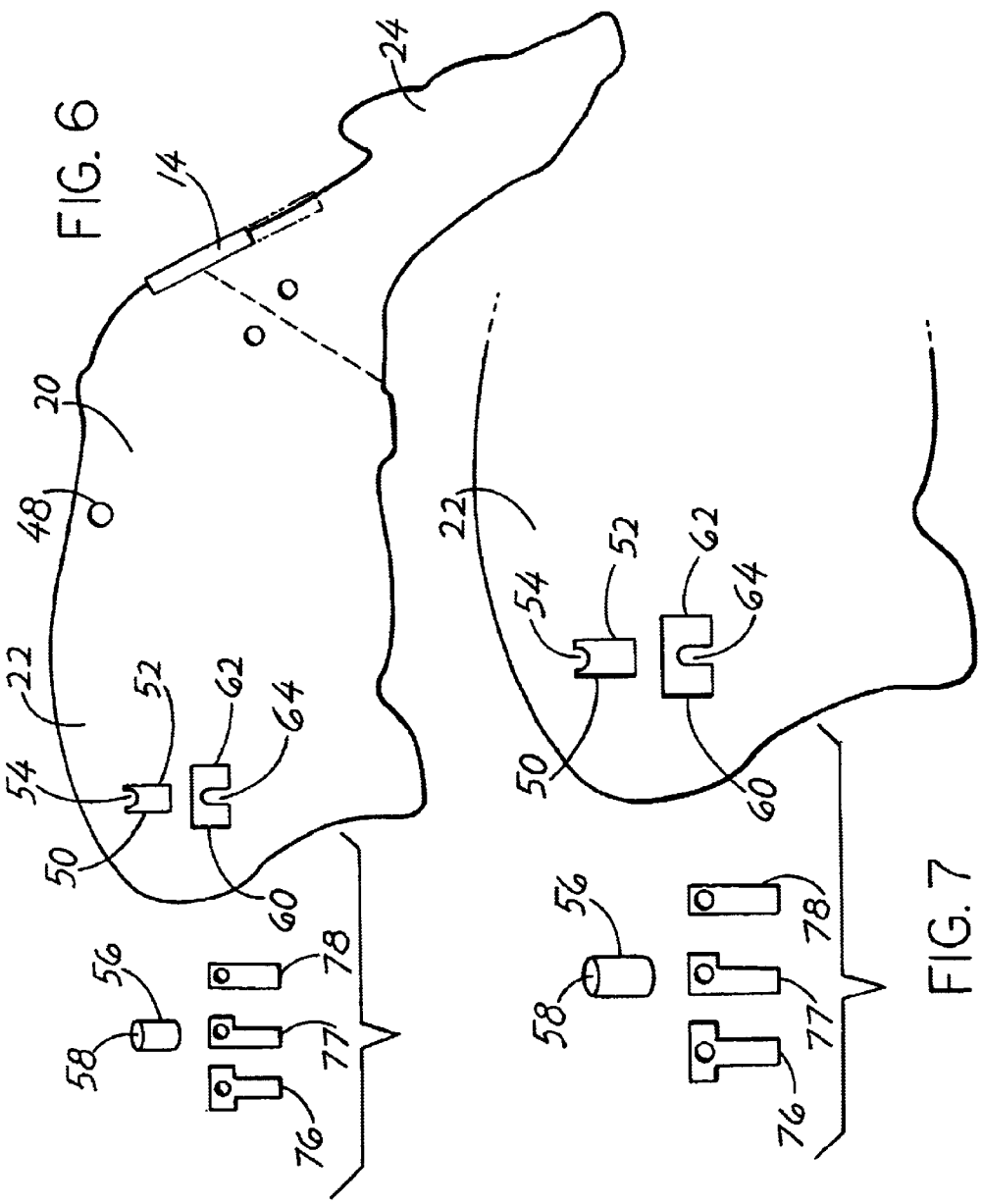

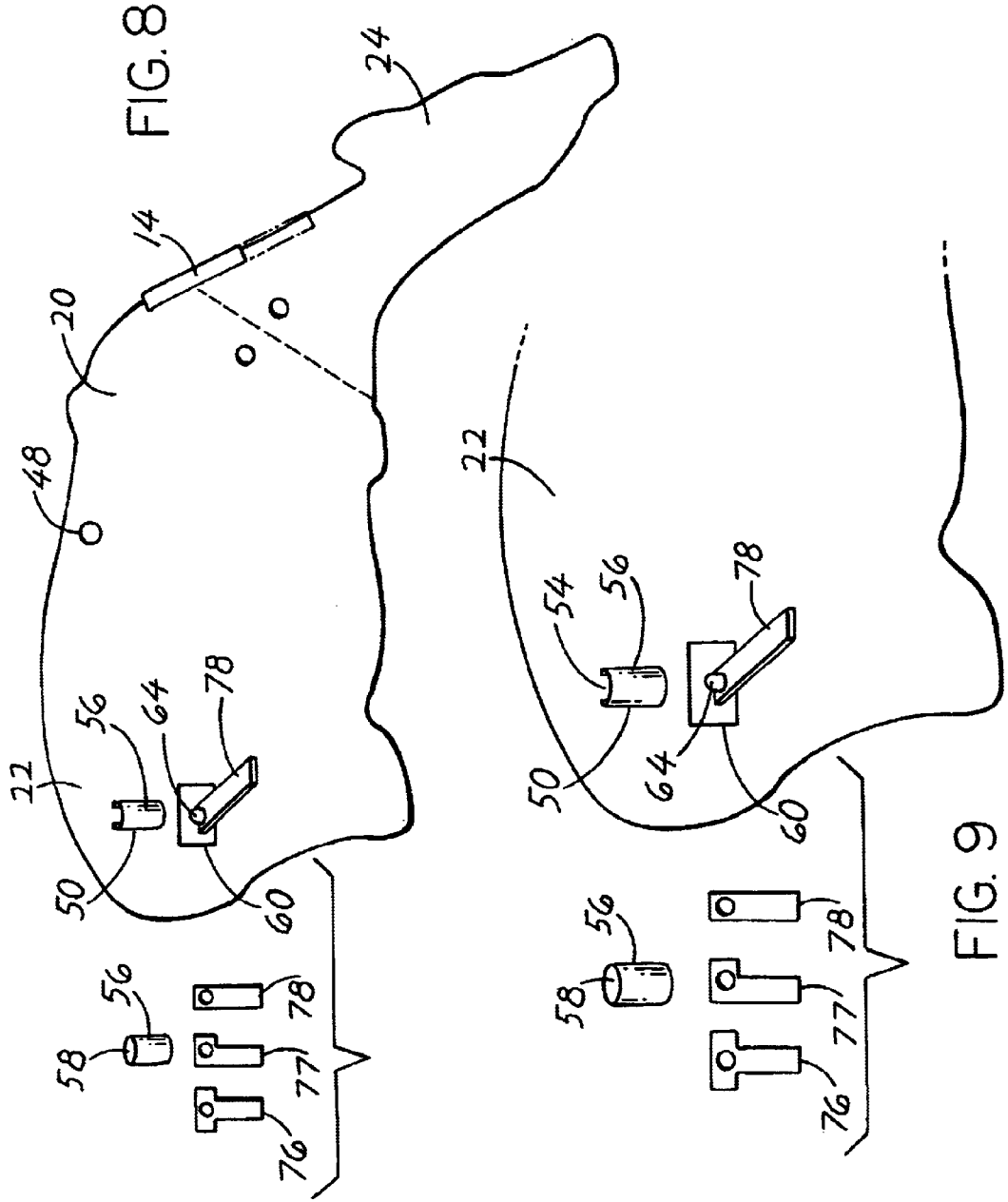

ANIMAL DECOY AND METHOD FOR MAKING SAME

FIELD OF THE INVENTION

The present invention relates generally to the field of hunting and to animal decoys of the type that are commonly used for hunting large game, such as deer, antelope, elk and the like, with a bow and arrows. More particularly, it relates to an animal decoy, and to a method for making the decoy, whereby the decoy simulates another animal both visually and odoriferously so as to aid in the attraction of other live animals to the area of the decoy. It also relates to a decoy that is easily transportable and readily usable in the field by the bow hunter.

BACKGROUND OF THE INVENTION

It has long been recognized by hunters that the use of animal decoys can aid in the attraction of like animals to the same area or vicinity as the decoy so that the hunter can be placed in relatively close proximity to his or her prey. This proximity greatly increases the odds of an arrow hitting its mark and the hunt being a success. Indeed, ancient hunters used straw duck and goose decoys to entice migratory flocks from the skies to areas of apparent safe haven only to fall prey to a hunter's swift arrow. Modem day bow hunters continue the practice of utilizing decoys of large game animals in their attempt to outsmart their prey. Some large game decoys are photorealistic. That is, they utilize a visually accurate depiction of a large game animal that is realistic, but stationary. Other decoys of modem manufacture are capable of assuming a somewhat three-dimensional solid form resembling that of the prey. See, for example, U.S. Pat. No. 4,821,444 issued to Remus. Bow hunters have continued to elevate the sophistication and art of large game decoys to the point that such decoys can incorporate movement mechanisms to simulate movement of like prey in an effort to entice the prey's visual senses and catch its attention. See, for example, U.S. Pat. No. 5,884,427 issued to Lenz. Other decoys incorporate noise generators and scent generators to access the prey's other senses in the attempt to entice. See, for example, U.S. Pat. No. 5,029,408 issued to Smith and U.S. Pat. No. 5,459,958 issued to Reinke.

In the experience of this avid bow hunter and inventor, however, most photorealistic decoys and all three-dimensional decoys that are presently commercially available tend to be bulky, are difficult to transport and set up, and are relatively expensive. Moreover, decoys that are commercially available have not been found by this inventor to utilize or incorporate a scent holder that is simple in construction and easy to use.

SUMMARY OF THE INVENTION

It is, therefore, a principal object of this invention to provide a new, useful and uncomplicated decoy assembly and a method for making same that requires only a minimal number of elements and that requires only a minimal number of steps to utilize. It is a further object of this invention to provide such an assembly that is realistic to other animals both in a visual sense and scentwise. It is yet another object of this invention to provide such an assembly that is lightweight and easily transported by the user and also easy to assemble and set up in the field. It is still another object of this invention to provide such an assembly that can be suspended from an object or free standing as such is desired or required by the user.

The present invention has obtained these objects. It provides, in the preferred embodiment, for a decoy assembly and a method for using same that includes a lightweight planar member contoured in the form of the silhouette of a large game animal. The planar member has two opposing faces. A visually and graphically accurate rendition of a large game animal, by artist's brush, photograph or otherwise, is applied to each face of the planar member. The planar member is foldable so as to reduce the bulk of the decoy assembly. It also includes an aperture for suspending one or more of the assemblies from a hunter's hip, belt, backpack or the like. When unfolded, the decoy assembly is held open by use of a generally U-shaped clip that is attached to the planar member at the point of the fold. Toward the top of the planar member, a second aperture is provided for suspending the decoy from a tree branch or the like. Toward the rearward portion of the decoy, a pair of scent holes is provided. One scent hole is functionally adapted to receive a scent canister within it. The other scent hold is functionally adapted to receive a felt scent wick within it. A pair of support rods may be provided to make the decoy free standing. The foregoing and A, other features of the device and method of the present invention will be further apparent from the description that follows.

BRIEF DESCRIPTION OF THE DRAWINGS

FIG. 5 is another front elevational view of the decoy assembly shown in FIG. 3 and showing the decoy when suspended from a tree branch or the like.

FIG. 6 is another front elevational view of the decoy shown in FIG. 3 and showing the scent canister and scent wicks that can be used with the decoy.

FIG. 7 is an enlarged partial front elevational view of the rearward portion of the decoy assembly shown in FIG. 6 and illustrating the scent holding apertures defined within it.

FIG. 8 is another front elevational view of the decoy shown in FIG. 3 and showing the scent canister and scent wicks when used with the decoy.

FIG. 9 is an enlarged partial front elevational view of the rearward portion of the decoy assembly shown in FIG. 8.

DETAILED DESCRIPTION

Figure 1:
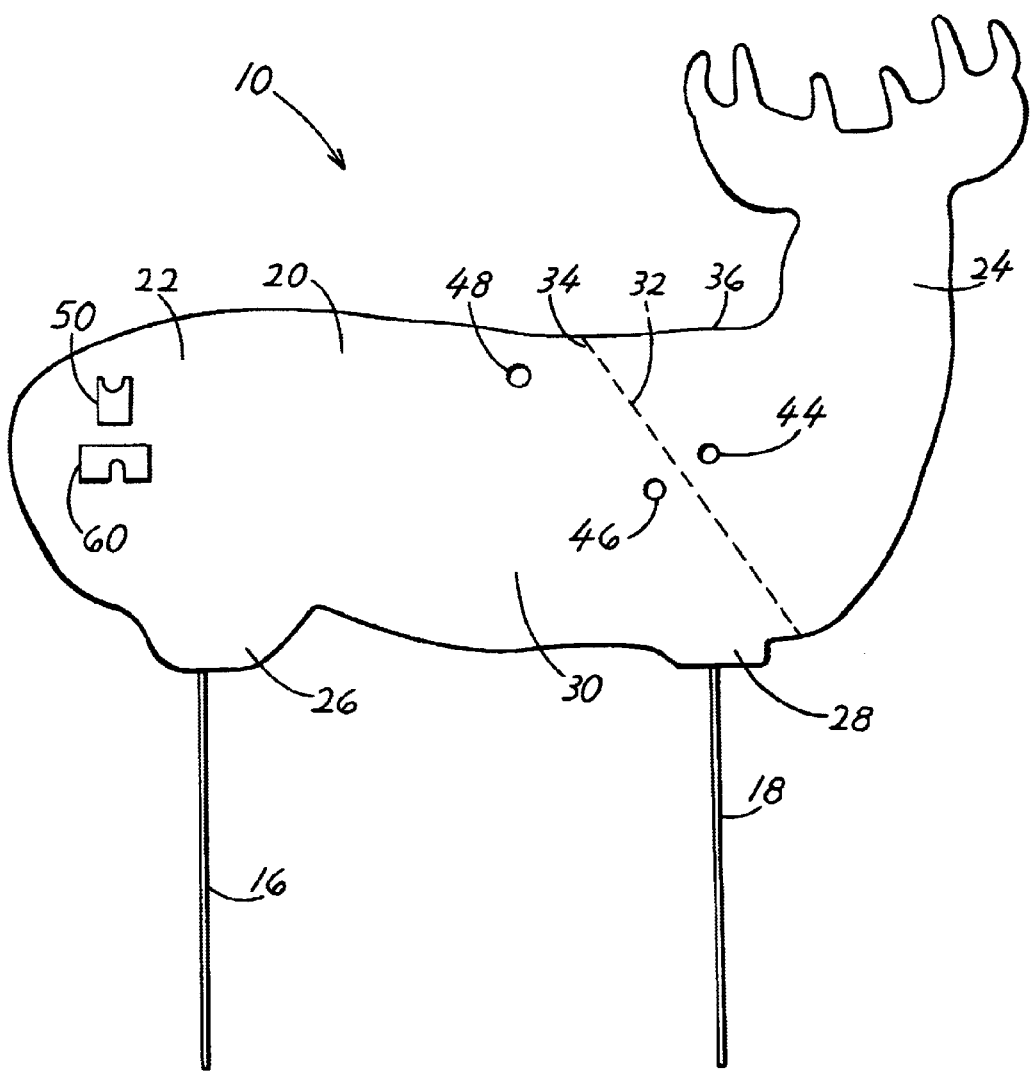
FIG. 1 is a front elevational view of an animal decoy assembly constructed in accordance with the present invention and showing an upright male deer, or buck, version of the decoy in the open, or unfolded, position.
Figure 2:
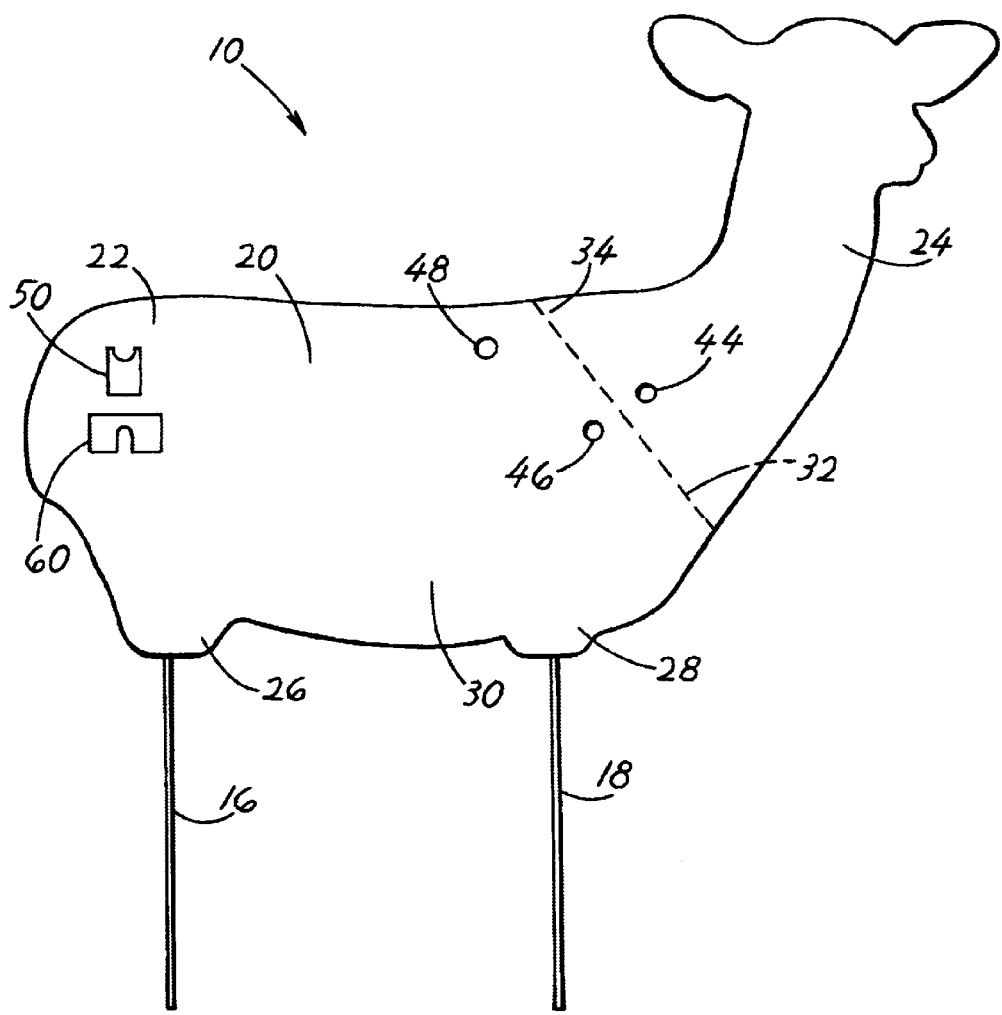
FIG. 2 is a front elevational view of another decoy assembly and showing an upright female deer, or doe, version of the decoy in the open, or unfolded, position.

Referring now to the drawings in detail, wherein like numbers represent like elements throughout, FIG. 1 illustrates a preferred embodiment of an animal decoy assembly, generally identified 10, that has been constructed in accordance with the device and method of the present invention. The assembly 10 includes a lightweight and substantially planar decoy frame or body 20. Although the planar decoy body 20 as shown in FIG. 1 assumes the shape or outline generally representative of a male deer, or buck, standing in an upright position, it is to be understood that a the shape could also be that of a feeding doe, a male deer, or buck, or even either sex of a different species of large game such as antelope, elk, or the like, without deviating from the scope of the present invention. See, for example, FIGS. 2 and 3. The planar decoy body 20 could be constructed of corrugated cardboard, closed-cell foam, fluted plastic or other semi-rigid like material and still come within the scope of the present invention. Affixed to either side of the decoy body 20 of the preferred embodiment is a pre-printed rendering of the animal (not shown), with one side being a mirror image of the other. The decoy body 20 includes a front body, or head, portion 24 and a rear body, or rump, portion 22. Immediately below the head portion 24 of the decoy body 20 is a front leg portion 28. And immediately below the rump portion 22 of the decoy body 20 is a rear leg portion 26. Situated between the head portion 24 and the rump portion 22 of the decoy body 20 is a main torso portion 30. In the preferred embodiment, a body fold or crease 32 is situated between the main torso portion 30 and the head portion 24 of the decoy body 20. This crease 32 allows the front body portion 24 of the decoy body 20 to fold over onto the other body portions 22, 30. See FIG. 4.

Figure 3:
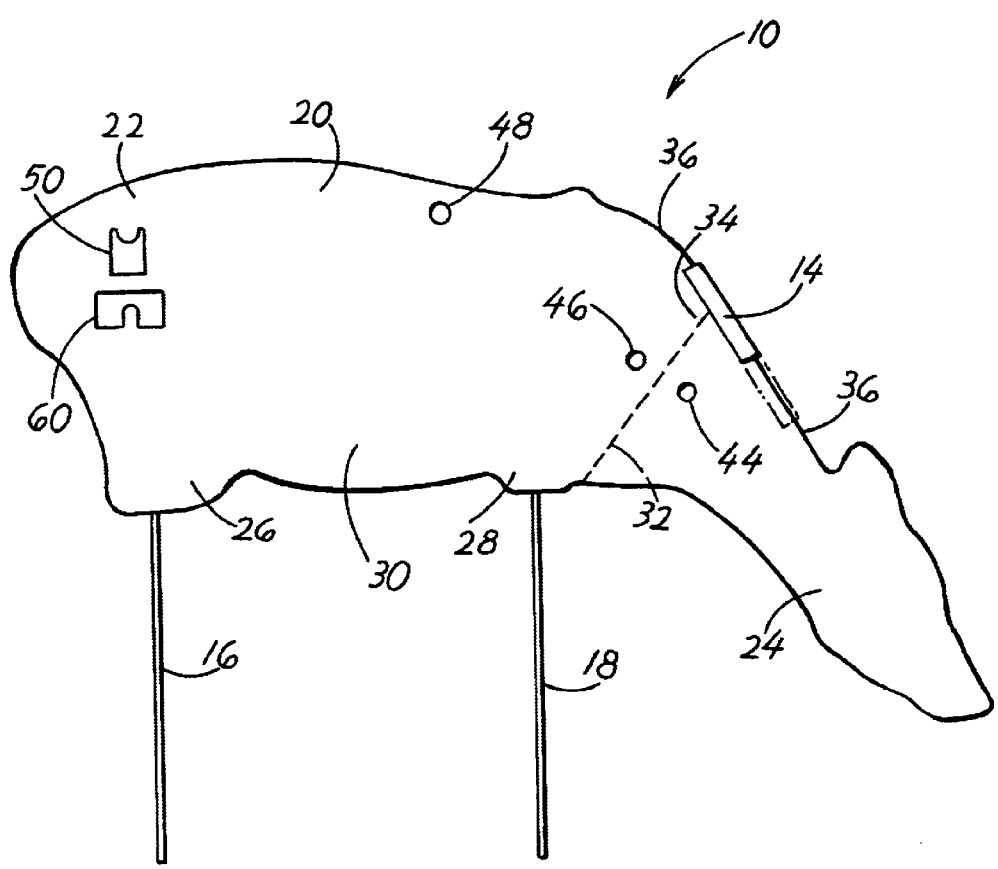
FIG. 3 is a front elevational view of yet another decoy assembly and showing a feeding doe version of the decoy in the open, or unfolded, position.

As shown in FIG. 3, the crease 32 has an uppermost portion 34 that lies along and effectively intersects the uppermost edge 36 of the main torso portion 30 of the decoy body 20. A generally U-shaped clip 14 is provided as part of the assembly 10. The clip 14 is functionally adapted to slide along the edge 36 of the decoy body 20 and over the uppermost portion 34 of the crease 32 for stabilizing the front body portion 24 relative to the other portions 22, 30 of the planar decoy body 20.

The preferred embodiment of the present invention also includes a number of apertures that are defined within the planar decoy body 20, each serving a different purpose. For example, one aperture 48 is provided that is defined within the uppermost portion of the torso 30. This aperture 48 lies at a point which allows the planar decoy body 20 to be balanced such that the body 20 can hang, for example, from the branch B of a tree or bush. See FIG. 5. Alternatively, the decoy body 20 may be free-standing. This is accomplished by using a pair of metal support rods 16, 18, one rod 16 being insertable within the rear leg portion 26 of the decoy body 20 and the other rod 18 being insertable within the front leg portion 28 of the decoy body 20. See FIGS. 1 through 3.

Another pair of apertures 44, 46 are defined within the planar decoy body 20 such that one aperture 44 lies within the front body 24 and one aperture 46 lies within the main torso portion 30 of the decoy body 20. See, for example, FIG. 1. This pair of apertures 44, 46 form a single bore 42 upon folding of the body 20 along the crease 32. See FIG. 4. A clip or a wire 12 may be inserted through the bore 42 for suspending the assembly 10 from the hunter's hip, belt, back-pack, or the like as the assembly 10 is transported to the hunting site. See FIGS. 10 and 11. Furthermore, one or more such assemblies 10 may be held in this fashion.

Finally, a first scent aperture 50 is defined within the rear body portion 22 of the planar decoy body 20. See FIGS. 6 and 7. The first scent aperture 50 is formed having a generally vertically oriented rectangular shape 52 with a downwardly directed lip 54 extending from the top of the rectangle 52 in the form of a semi-circle 54. With this configuration, a standard plastic 35 mm. film canister 56 may be inserted within the first scent aperture 50 with the lip 54 being insertable within the canister opening 58. The lip 54 keeps the canister 56 secure within the aperture 50. Prior to insertion of the canister 56 within the first scent aperture 50, the hunter may pour a quantity of liquid scent, such as deer urine or the like, into the canister 56. A second scent aperture 60 is similarly defined within the rear body portion 22 of the planar decoy body 20. The second scent aperture 60 is formed having a generally horizontally oriented rectangular shape 62 with an upwardly directed tab 64 extending from the bottom of the rectangle 62. With this configuration, a standard scent hang wick 76, 77, 78 of current manufacture may be suspended from the tab 64, the wick 76, 77, 78 being saturated with liquid scent. See FIGS. 8 and 9.

In the method of the present invention, a planar sheet of lightweight substrate, such as corrugated cardboard, fluted plastic or the like, is used as the base for the two-dimensional image of an animal (not shown) that is attached to each side of the substrate. Using this image as a guide, the shape or outline generally representative of a female deer, or doe, standing in an upright position is stamped out of the substrate. See FIG. 2. This forms the planar decoy frame or body 20. At the same time, the support aperture 48, the carrying apertures 44, 46, and the scent apertures 50, 60 are all stamped or die cut into the decoy body 20. As previously described, the shape could also be that of a feeding doe, a male deer, or buck, or even either sex of a different species of large game such as antelope, elk, or the like, without deviating from the scope of the present invention. See FIGS. 1 and 3. Additionally, the planar decoy body 20 could be constructed of corrugated cardboard, closed-cell foam or other semi-rigid like material and still come within the scope of the method of the present invention.

Figure 4:
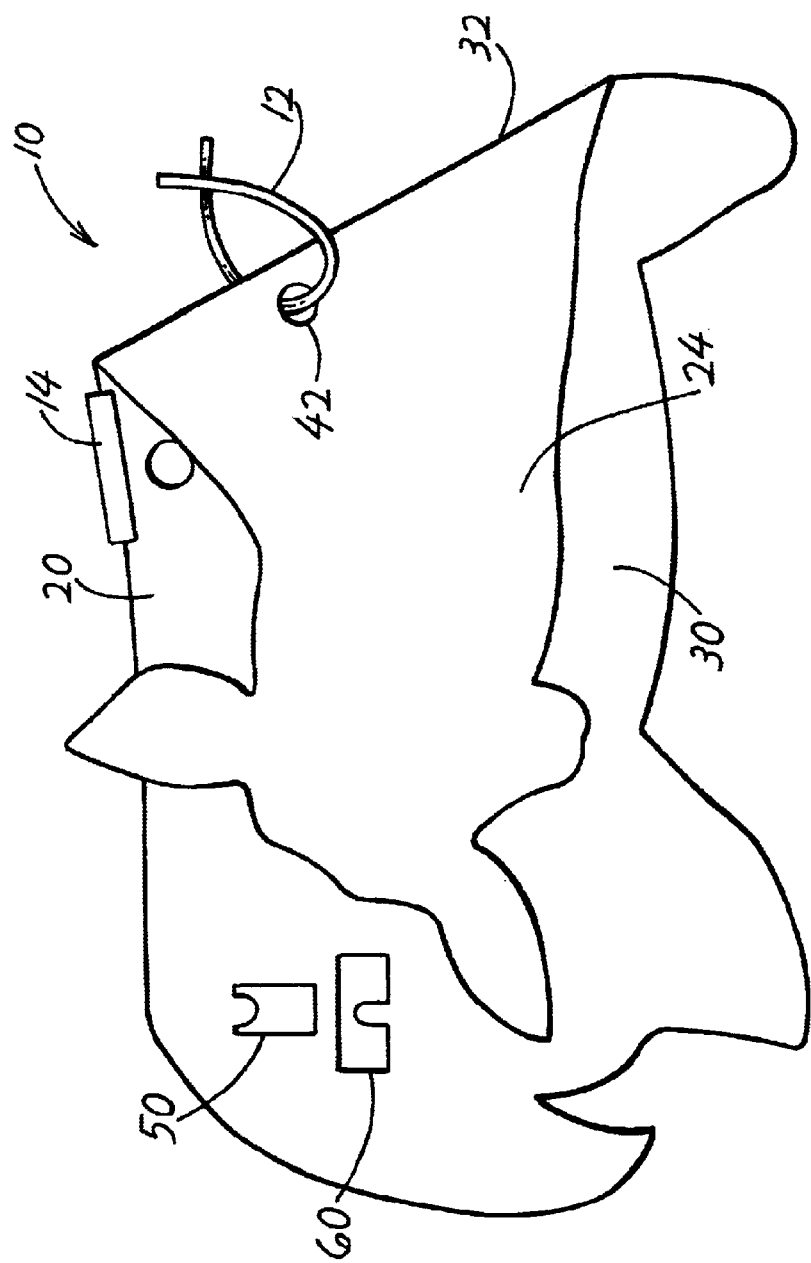
FIG. 4 is another front elevational view of the decoy assembly shown in FIG. 2 and showing the decoy in the folded, or closed, position for ease of transportation.
Figure 5:
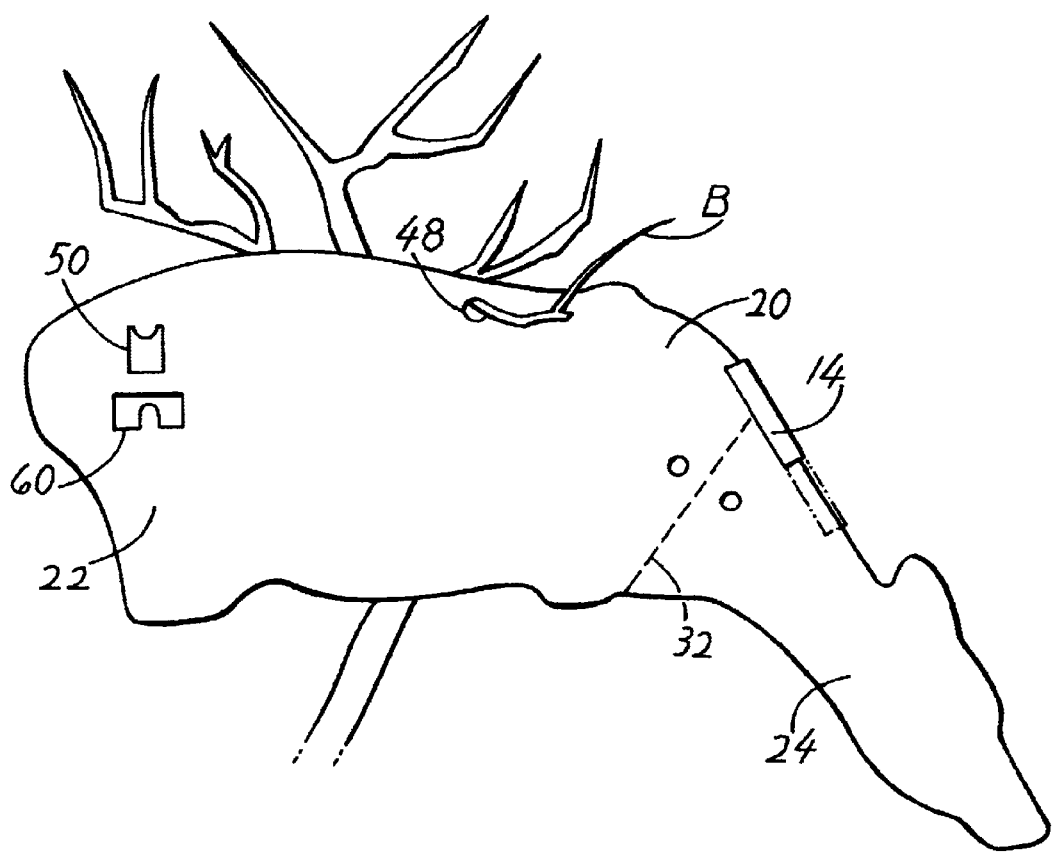
Figures 10, 11:
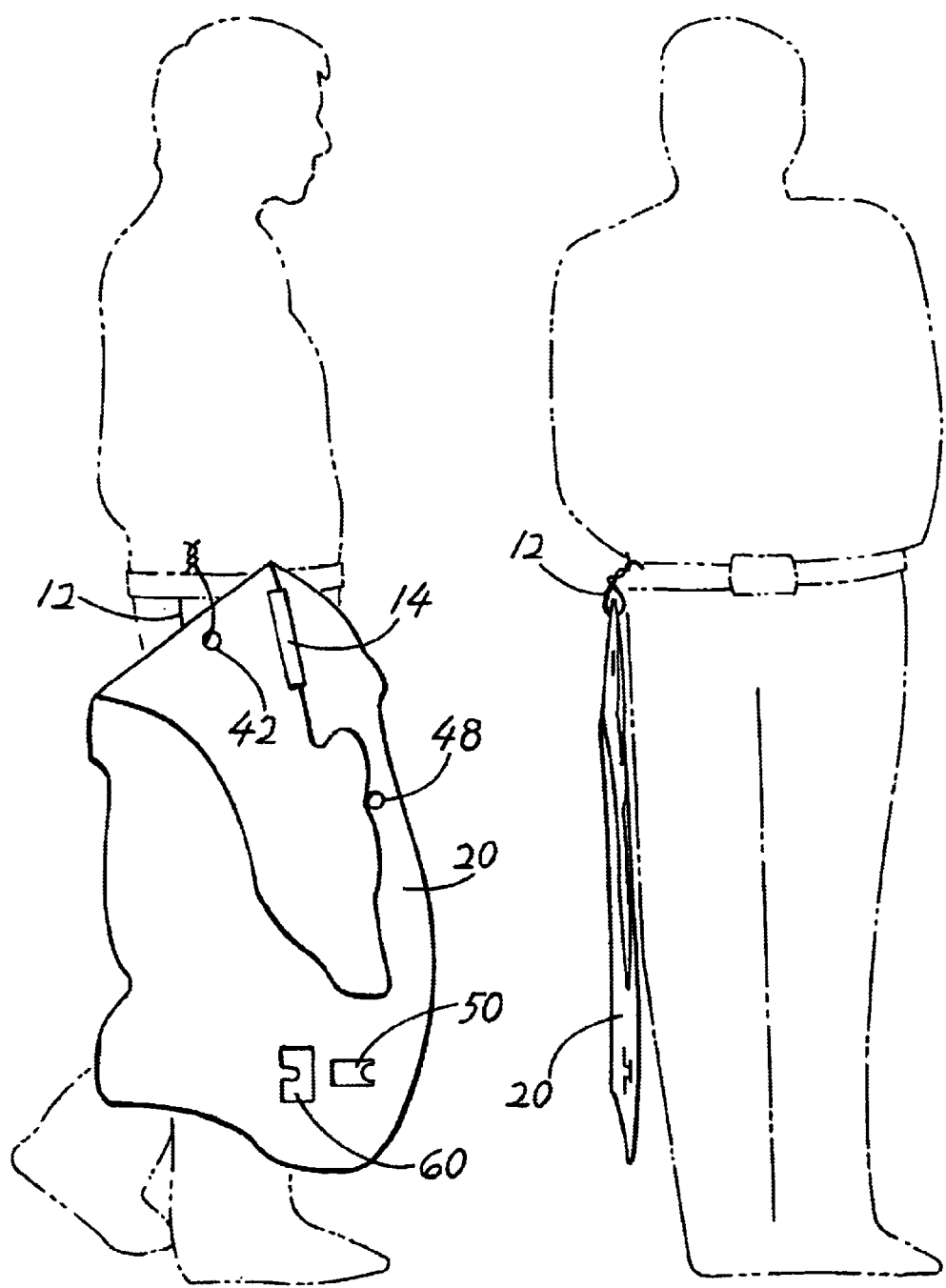
FIG. 10 is a front elevational view of the decoy shown in FIG. 4 when folded and showing the decoy being transported by the hunter, the hunter being shown in phantom view.
FIG. 11 is a top plan view of the decoy shown in FIG. 10, again with the hunter shown in phantom view.

In application, the hunter takes one or more of the assemblies 10 with him or her, each assembly 10 being suspended from the hunter's belt or backpack, for example, by use of a clip or wire 12 as shown in FIGS. 4, 10 and 11. Once the hunter reaches the preferred decoy site, the assembly is detached from the wire 12 and the front body portion 24 is folded outwardly away from the torso 30 as shown in FIG. 1. The clip 14 is slid along the uppermost edge 36 of the decoy body 20 to the point that the clip 14 overlays the upper portion 34 of the body fold or crease 32. The planar decoy body 20 may be suspended from a tree branch B or the like by use of the single aperture 48 located within the torso portion 30 of the decoy body 20 as shown in FIG. 5. Alternatively, the decoy body 20 may be free-standing by inserting the rods 16, 18 into the rear leg and front leg portions 26, 28, respectively, as previously described. A standard plastic 35 mm. film canister 56 may be inserted within the first scent aperture 50 with the lip 54 being insertable within the canister opening 58. Prior to insertion of the canister 56 within the first scent aperture 50, the hunter may pour a quantity of liquid scent, as previously described, into the canister 56. Alternatively, the hunter may instead choose to suspend a standard scent hang wick 76, 77, 78 from the tab 64 of the second scent aperture 60, the wick 76, 77, 78 being saturated with liquid scent. The hunter is now ready to move away from the assembly 10 and into a nearby location, waiting for an inquisitive prey to check out the decoy.

From the foregoing detailed description of the illustrative embodiment of the invention set forth herein, it will be apparent that there has been provided a new and useful decoy assembly and a method for making same that requires only a minimal number of elements and only a minimal number of steps to utilize; that is realistic to other animals both in a visual sense and scentwise; that is lightweight and easily transported by the user and also easy to assemble and set up in the field; and that can be suspended from an object or free standing as such is desired or required by the hunter.

The principles of this invention having been fully explained in connection with the foregoing, I hereby claim as my invention:

1. A decoy for attracting animals, the decoy comprising a two-dimensional foldable planar member having a shape generally representative of an animal,
   at least one slidable support positioned on at least a top ridge of the planar member to be slidably positioned to support the planar member in an unfolded arrangements
   a visual representation of the animal disposed on each side of the two-dimensional planar member, and
   at least one scent container holder defined within the two-dimensional planar member and configured to support a scent container therewithin,
   wherein the scent container houses fluid having a scent capable of animal attraction.

2. A decoy assembly for attracting large game animals, the assembly comprising
   a foldable two-dimensional visual representation of a large game animal, the visual representation being consistent with an actual appearance of a large game animal and having at least one ridge at the point of a fold along the periphery of the two-dimensional visual representation, at least one slidable support positioned on the at least one ridge of the visual representation to be slidably positioned to support the two-dimensional visual representation in an unfolded arrangement, and
   at least one aperture defined within the two-dimensional visual representation for affixing a removable scent holder to one side of the foldable two-dimensional visual representation at one end thereof, the scent holder configured to house a fluid detectible and attractable to a large game animal.

3. The assembly of claim 2 wherein the removable scent holder is a container that is refillable, said container being open at one end and closed at the other end, and the at least one aperture is a generally rectangular opening of the approximate size of the profile of the container and having a lip extending into the opening, said lip being receivable by the open end of the scent holding container.

4. The assembly of claim 2 wherein the removable scent holder is a scent wick, said scent wick comprising a planar member having an aperture defined within it, and the at least one aperture is a generally rectangular opening having a lip extending into the opening, said lip being receivable by the aperture of the scent wick.

5. The assembly of claim 2 wherein the foldable two-dimensional visual representation includes at least one aperture configured to receive a connector therethrough to suspend the foldable two-dimensional visual representation from a branch.

6. The assembly of claim 2 further comprising at least one leg connectable to the foldable two-dimensional visual representation to support the foldable two-dimensional visual representation in a free-standing arrangement.

7. The assembly of claim 2 wherein the two-dimensional visual representation further includes a pair of mutually aligned apertures that form a single bore upon folding of the visual representation.

8. The assembly of claim 2 wherein the single bore is configured to receive a connector for securing the visual representation to a person during transportation of the assembly.

9. The assembly of claim 2 wherein the large game animal is a deer, an antelope, an elk, or the like.

10. A method of manufacturing an animal decoy, the method comprising the step of
    creating a two-dimensional frame having the outline of an animal, said two-dimensional frame having a frame periphery, developing a two-dimensional image of the animal, securing the two-dimensional image to at least one side of the two-dimensional frame such that the frame and the image together form a two-dimensional visual representation of the animal,
    creating a fold in the two-dimensional frame such that a first portion of the frame can be folded over onto a second portion of the frame.
    providing at least one slidable support to be slidably positioned alone the fold at its intersection with the periphery of the frame so as to support the two-dimensional frame in its unfolded arrangement, and defining at least one scent holder aperture within the two-dimensional frame.

11. The method of claim 10 wherein the step of securing includes the step of applying a laminate on an outer surface of the at least one side of the two-dimensional frame.

12. The method of claim 10 wherein the scent holder aperture defining step includes defining an aperture for receiving a canister therewithin, said canister being open at one end and closed at the other end, and said aperture is a generally rectangular opening of the approximate size of the profile of the canister and having a lip extending into the opening, said lip being receivable by the open end of the canister.

13. The method of claim 10 wherein the scent holder aperture defining step includes defining an aperture for receiving a felt scent wick therewithin, said wick comprising a planar member having an aperture defined within it, and the scent holder aperture is a generally rectangular opening having a lip extending into the opening, said lip being receivable by the aperture of the scent wick.

14. The method of claim 10 wherein the two-dimensional frame creating step includes forming the outline of a large game animal such as a deer, an antelope, an elk, or the like.

* * * * *